April 15, 1958 H. DEURING ET AL 2,830,637
RESILIENT WHEEL
Filed March 29, 1955 2 Sheets-Sheet 1
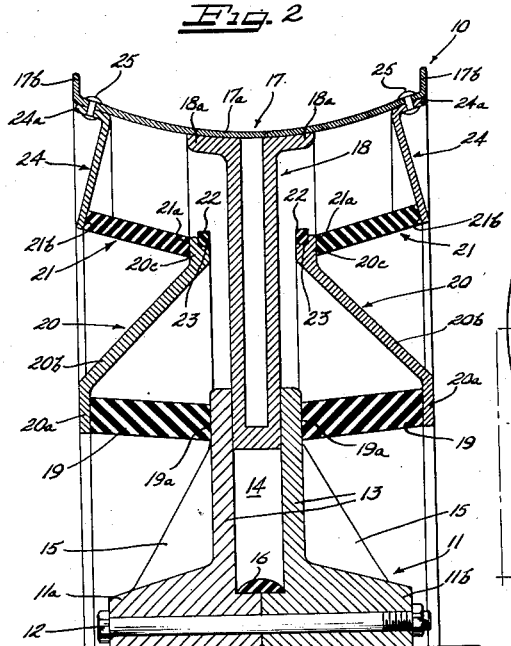
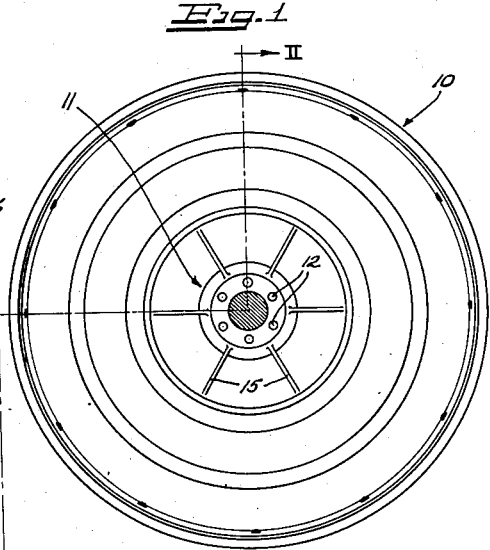
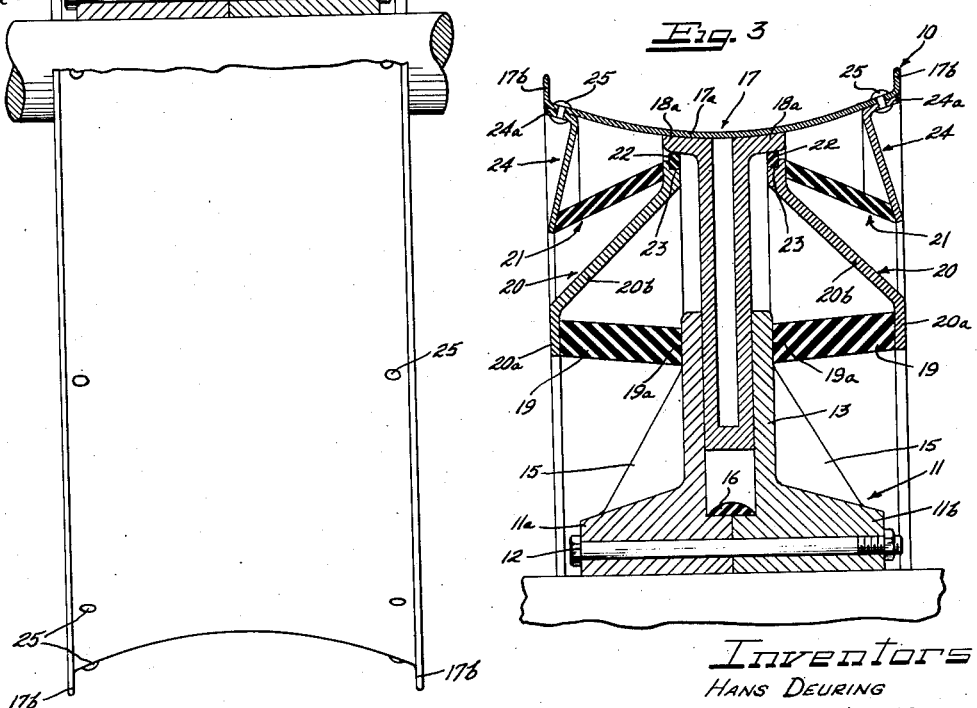
Inventors
HANS DEURING
ALBRECHT-WOLF MANTZEL April 15, 1958 H. DEURING ET AL 2,830,637
RESILIENT WHEEL
Filed March 29, 1955 2 Sheets-Sheet 2
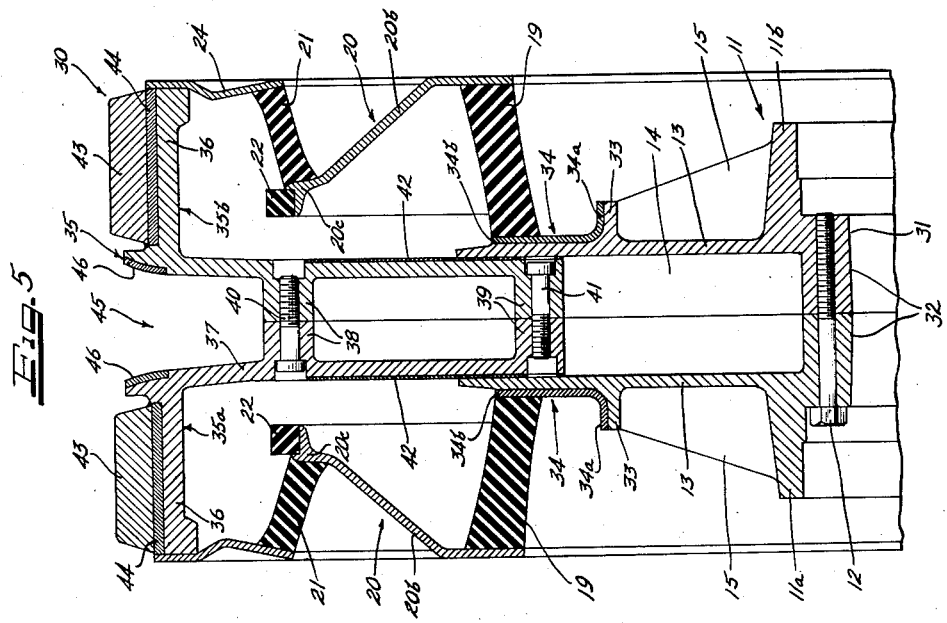
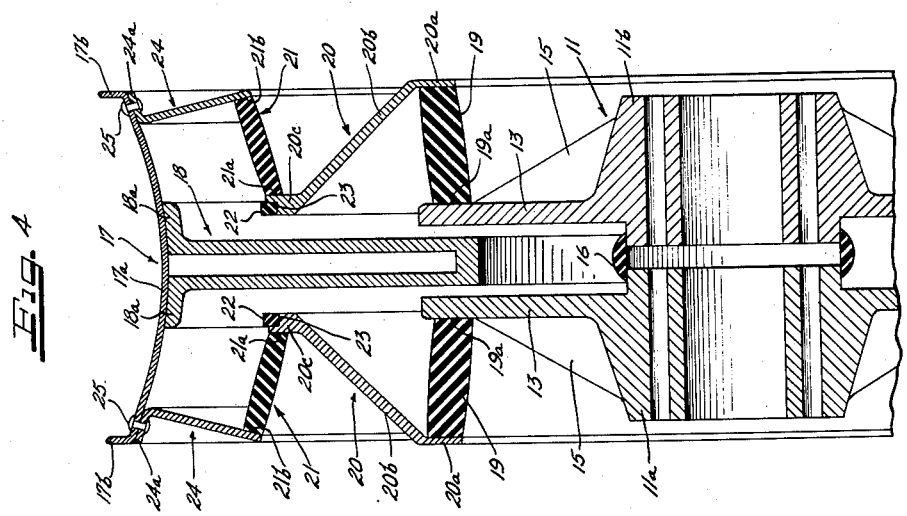
Inventors
HANS DEURING
ALBRECHT-WOLF MANTZEL

United States Patent Office 2,830,637
Patented Apr. 15, 1958

2,830,637

RESILIENT WHEEL

Hans Deuring, Burscheid, near Cologne, and Albrecht-Wolf Mantzel, Stuttgart, Mohringen, Germany, assignors, by mesne assignments, to Rand-Goetze Corporation, Cleveland, Ohio, a corporation of Ohio Application March 29, 1955, Serial No. 497,732

Claims priority, application Germany October 28, 1954

7 Claims. (Cl. 152—49)

This invention relates to resilient wheel structures having a plurality of rubber rings arranged in series to join the hub and rim components of the wheels. Specifically, this invention deals with vehicle wheels having a first set of rubber rings connecting the rim with a pair of intermediate metal disks and a second set of rubber rings connecting these disks with the hub wherein the first set of rings are easily deflectable to absorb slight deflections of the hub and rim such as are caused by movements of the rim in going over uneven ground and wherein the second set of rings are more rigid and only deflect to absorb heavier shocks.

While the hereinafter specifically described and illustrated wheels contain only two sets of rubber rings in concentric relation, it should be understood that additional sets of rings can be provided to increase the number of elements in the series of rings between the rim and hub. It should also be understood that the outermost sets of rubber rings or sleeves will be less rigid and, therefore, more easily deflected than the inner sets of rings or sleeves. Bumpers or other limiting devices are provided to prevent excessive deflection of the rings so that the successive sets of rings or sleeves will be automatically inactivated whereupon further deflection of the rim and hub components will deflect the next set of more rigid rings or sleeves.

According to this invention, the rim and hub components are stabilized against lateral or axial deflection by radial slides or guides including interfitting disks and recesses respectively carried by the hub and rim. The rubber sleeves or rings are symmetrically disposed on opposite sides of the guides and are prestressed so that they will always remain in tension and even during operation of the wheel, the sleeves or rings will not go through a neutral point of no tension or into a state of compression. The intermediate metal disk members connecting the sets of rubber rings or sleeves in series preferably have axial outer ends connected to the outer ends of the innermost sleeves and axial inner ends connected to the inner ends of the outermost sleeves. The connecting metal disks are cranked or sloped so that their outer peripheral portions form the axial inner ends thereof and the inner peripheral portions form the outermost axial ends thereof.

It is then an object of this invention to provide a resilient wheel with a series of successively deflectable rubber sleeves or rings connecting the hub and rim components.

A still further object of this invention is to provide a spring wheel having hub and rim components connected only through a series of rubber sleeves and metal disks arranged in symmetrical pairs on opposite sides of the medial plane of the wheel and having the constituent sleeves thereof pretensioned but resiliently deflectable for absorbing relative radial and circumferential displacements of the rim and hub components.

Another object of this invention is to provide a rubber sprung vehicle wheel having hub and rim parts maintained in axial alignment by interfitting slides and connected by at least one pair of rubber sleeves on each side of the slide with the sleeves arranged in series wherein the outer end of one sleeve is connected to the inner end of the next sleeve.

A further object of the invention is to provide a rubber sprung wheel accommodating greater displacement of the hub and rim components.

A still further object of this invention is to provide a rubber sprung wheel with a first pair of rubber sleeves for absorbing light impacts and a second pair of rubber sleeves for absorbing heavy impacts.

A still further object of the invention is to provide a rubber sprung vehicle wheel especially adapted for absorbing high and low frequency vibrations such as occur in caterpillar vehicles.

A specific object of this invention is to provide a dolly wheel for track laying vehicles which will accommodate deflection of the hub and rim components throughout a wide range of travel without undue stress in the members which connect the rim and hub components.

Other and further objects of the invention will be apparent to those skilled in the art from the following detailed description of the annexed sheets of drawings which, by way of preferred examples only, illustrate several embodiments of the invention.

On the drawings:

Figure 1 is a front elevational or plan view of a vehicle wheel of this invention.

Figure 2 is a cross-sectional view, with parts in side elevation, taken along the line II—II of Figure 1.

Figure 3 is a view similar to Figure 2 but showing the rim and hub components in a displaced condition.

Figure 4 is a view similar to Figure 3 but illustrating free lengths of the rubber sleeves and designating the manner in which these sleeves are tensioned when the wheel is assembled.

Figure 5 is a quarter-sectional view of a tractor dolly wheel according to this invention.

As shown on the drawings:

The wheel 10 of Figures 1 to 4 includes a hub 11 composed of two half-sections 11a and 11b held together by bolts 12. Each hub section 11a, 11b, has a radially extending flange 13. The flanges 13 cooperate to provide a radial slot or groove 14 therebetween. Reinforcing webs 15 are provided at the sides of the flanges 13 and extend therefrom to the hub sections 11a, 11b. The bottom of the slot or groove 14 is covered with a rubber bumper ring 16 for a purpose to be more fully hereinafter described.

The wheel 10 has a rim 17 surrounding the hub 11. The rim has a concave bottom 17a with outturned radial flanges 17b at the ends thereof.

A radial guide disk 18 having outturned peripheral flanges 18a secured to the central portion of the rim wall 17a extends radially inward into the slot or groove 14 to have a sliding fit with the flanges 13. The guide disk 18 can be hollow as shown or can be composed of two separate plates with a suitable spacer therebetween if desired.

The guide disk 18 and the flanges 13 cooperate to hold the hub 11 and the rim 17 in axial alignment while accommodating circumferential and radial displacements thereof. The bumper ring 16 is adapted to cushion the impact of the disk 18 on the bottom of the slot or groove 14 in the event of excessive displacement of the hub and rim components.

A first pair of rubber sleeves or rings 19, 19 each have inner end portions 19a vulcanized to a flange 13 adjacent the radial outer end of the flange. The sleeves or rings extend generally axially outward from the flanges 13 to the axial outer ends 20a on the inner marginal peripheries of metal disks 20. The rings or sleeves 19 are vulcanized to the stepped or flanged portions 20a on the inner marginal ends of the metal disks or connector members 20. These members 20 slope axially inward and radially outward from the margin 20a and have sloping main body portions 20b on opposite sides of the guide disk 18. The ends 20c at the axial inner and radially outer marginal portions of the metal disks or members 20 extend generally radially outward and have the inner ends 21a of a second pair of rubber sleeves or rings 21 vulcanized to their outer faces. Rubber bumper rings 22 are bonded to the outer peripheral margin of the ends 20c preferably in grooves 23 formed therein.

The second pair of rubber sleeves or rings 21 extend axially and radially outward from the flanges 20c to overlie the sloping body portions 20b of the members 20. The outer ends 21b of these sleeves 21 are vulcanized to the inner faces of a second pair of metal rings 24 at the inner marginal peripheries of these rings. The rings 24 slope axially inward and radially outward to the outturned flanges 24a around their outer peripheries. These flanges underlie the rim wall 17a adjacent the rim flanges 17b and are secured to the rim wall as by means of rivets 25 or any other suitable fasteners including welded bonds.

Any suitable tire (not shown) can be provided around the rim wall 17a and between the rim flanges 17b.

Each of the rubber sleeves 19 and 21 is considerably longer and wider than thick and is connected at its ends only to the metal parts of the wheel with the elongated main length of the body thereof being unsupported. Each sleeve in general, has the shape of a surface of revolution in which the generatrix is a straight line and lies in the same plane as the axis of revolution. In the specific illustrated form, the sleeves are frusto conical in shape with the small diameter ends disposed adjacent the medial plane of the wheel and the large diameter ends disposed laterally outward therefrom.

As illustrated in Figure 4, when the bolts 12 are loosened, the hub sections 11a and 11b will be separated because the rubber sleeves are under considerable axial tension when the bolts 12 are tightened and the hub is in operating position. The free state length or width of the sleeves is, therefore, considerably less than the operating length even when the hub and rim components are not displaced.

The sleeves 19 are preferably thicker and stiffer than the sleeves 21 so as to more firmly resist deflection. Therefore, as illustrated in Figure 3, the sleeves 21 will first deflect to accommodate displacements of the hub and rim and when the bumpers 22 engage the flanges 18 of the guide disk for limiting further deflection of these sleeves 21 then the sleeves 19 can deflect to accommodate further displacement of the hub and rim components. Ultimate deflection or displacement of the hub and rim components is limited by bottoming the guide disk 18 on the bumper 16.

The sleeves 19 and 21 can also accommodate circumferential displacements of the hub and rim components and these displacements are accommodated in succession by the sleeves 21 and then the sleeves 19. Torsion loads tending to circumferentially displace the hub and rim components are first absorbed by the sleeves 21 and when their resistance to further torsional displacement reaches the displacement resistance of the sleeves 19 then these sleeves will begin to twist to accommodate further circumferential displacement.

The wheels of this invention are especially useful in the so-called idler or bogie wheels of caterpillar type tractors and the bogie wheel or idler wheel 30 of Figure 5 illustrates a preferred type of wheel according to this invention. In this wheel, parts substantially identical with parts described in Figures 1 to 4, have been marked with the same reference numerals. The hub 11, instead of receiving the bolt 12 through the full length of the sections 11a and 11b thereof, has a reduced width central portion 31 receiving the bolts therethrough and providing tapered bearing walls 32 for roller bearings or the like. The flanges 13 of the hub also have axially outwardly extending ribs 33 inwardly from the outer ends thereof and the reinforcing flanges or ribs 15 are connected to these portions.

Metal disks 34 overlie the flanges 13 around the outer peripheral margins thereof and have outturned flanges 34a surrounding the ribs 33. These disks are bonded along their outer faces around the outer peripheral margins 34b thereof to the inner ends of the first pair of rubber sleeves or rings 19. The metal disks 34 can be secured to the flanges 13 by screws or any suitable fasteners (not shown).

The wheel 30 has a rim 35 substantially different from the rim 17 of the wheel 10. This rim 35 is formed in two half-sections 35a and 35b. Each section 35a and 35b has a circular band portion 36 extending axially outward from the outer margin of a radial disk portion 37. Each disk portion 37 has raised ring-like ribs 38 in abutting relation. Bolts 40 and 41 extending through these ribs 38 and 39 connect the two half-sections of the rims in back-to-back relation. The outer faces of the disk 37 are covered with a suitable wear-resistant material 42 for slidably engaging the inner faces of the flanges 13 on the hub.

The band portions 36 receive solid rubber tires 43 therearound and these tires have metal base rings 44 force fitted on the bands. A recess 45 is provided between the disks 37 radially outward from the ribs 38 and insert rings 46 are seated in grooves in the disks at the mouth of the recess 45.

Tracks for track-laying or caterpillar tractors engage the tires 43 and also fit into the recess 45 to be held in axial alignment on the bogie wheel 30.

The disks 24 are secured to the outer edges of the bands 36 as by means of screws or the like (not shown).

In operation, the disks 37 with their covers 42 will coact with the flanges 13 of the hub to hold the rim and hub components in axial alignment while accommodating radial and circumferential displacement of these components. The rubber sleeves or rings 19 and 21 are pretensioned and form the sole connectors between the rim and hub components after the bumpers 2 engage the bands series with the rings 21 deflecting first to accommodate light load displacements and with the rings 19 being deflected to accommodate further displacements of the rim and hub components after the bumpers 22 engage the bands 36 to inactivate the sleeves or rings 21.

From the above descriptions it will, therefore, be understood that this invention now provides a rubber sprung wheel having circumferentially and radially displaceable hub and rim components connected through a series of tensioned rubber sleeves or rings. The connecting series of rings is so arranged that they will deflect in succession.

It will be understood that variations and modifications may be effected without departing from the scope of the novel concepts of this invention.

For illustrative purposes the various resilient members of the series shown have been described as operating in a somewhat over-simplified manner. Thus, in response to load there may be some deflection of all the resilient members of a series spring arrangement before the softer or weaker members have completely collapsed. However, with the desired differences of resilience of sleeves 19 and 21, the deflection of the relatively stiffer sleeve members 19 is very minor in comparison to the deflection of the relatively weaker sleeve members 21; so for purposes of disclosure, the operation of the sleeves 19 have been described as not deflecting until the sleeves 21 have deflected to the extent at which the bumpers 22 and the guide disk flanges abut. In like manner has been explained the operation of circumferential displacement in response to torsional loads.

We claim as our invention:

1. A wheel which comprises a hub part, a rim part, a first pair of opposed elastic rubber sleeves having corresponding ends thereof attached to the rim part, a second pair of opposed elastic rubber sleeves having corresponding ends thereof connected to the hub part, a pair of opposed intermediate metal disks connected to the other ends of the sleeves of each pair to rigidly join the sleeves in series relation whereby the hub and rim are connected through a plurality of rubber sleeves adapted to accommodate radial and circumferential displacements of the hub and rim, and means interengaged between said rim part and said hub part permitting relative radial sliding movement and rigid against relative axial movement of said parts.

2. A wheel which comprises a hub part, a rim part, a pair of opposed elastic rubber sleeves attached to the hub part and extending laterally outward therefrom, a second pair of opposed elastic rubber sleeves attached to the rim part and extending axially inward therefrom, a pair of metal disks connecting the outer ends of the first pair of sleeves with the inner ends of the second pair of sleeves to unite the hub and rim parts through the sleeves, said first pair of sleeves being more rigid than the second pair whereby the second pair will initially deflect to accommodate radial and circumferential displacements of the hub and rim, and the first pair of sleeves will deflect after the second pair to accommodate heavy stresses and impacts, and means interengaged between said rim part and said hub part permitting relative radial sliding movement and rigid against relative axial movement of said parts.

3. A wheel which comprises a hub part, a rim part, a first pair of opposed elastic rubber sleeves having the axially inner end thereof attached to the hub part, a second pair of opposed elastic rubber sleeves having the axially outer ends thereof connected to the rim part, said sleeves being substantially longer axially than radially thick, and a pair of opposed intermediate metal disks connected to the other ends of the sleeves of each pair to join the sleeves in series relation whereby the hub and rim are connected through a plurality of rubber sleeves adapted to accommodate radial and circumferential displacements of the hub and rim.

4. A wheel as in claim 3 wherein said first pair of sleeves is more rigid than said second pair of sleeves whereby the second pair will initially deflect more readily to accommodate radial and circumferential displacements of the hub and rim and the first pair of sleeves will deflect after the second pair to accommodate heavy stresses and impacts.

5. A wheel as in claim 3 including means interengaged between said rim part and said hub part permitting relative radial movement and permitting only limited relative axial movement of said parts.

6. A wheel as in claim 5 wherein said sleeves are axially pre-stressed and said sleeves normally resist limited relative axial movement of said parts.

7. A wheel as in claim 3 including means interengaged between said rim part and said hub part permitting relative radial sliding movement and rigid against relative axial movement of said parts.

References Cited in the file of this patent

UNITED STATES PATENTS

| | | |
|---|---|---|
| 1,071,953 | Picard | Sept. 2, 1913 |
| 2,528,156 | Maiorca | Oct. 31, 1950 |

FOREIGN PATENTS

| | | |
|---|---|---|
| 14,400 | France | Sept. 26, 1911 |
| 1,053,995 | France | Oct. 7, 1953 |

(Corresponding Great Britain 723,975, Feb. 16. 1955)

U. S. DEPARTMENT OF COMMERCE
PATENT OFFICE

CERTIFICATE OF CORRECTION

Patent No. 2,830,637     Hans Deuring et al.          April 15, 1958

It is hereby certified that error appears in the printed specification of the above numbered patent requiring correction and that the said Letters Patent should read as corrected below.

Column 4, line 45, after "components" insert a period; same line, strike out "after the bumpers 2 engage the bands" and insert instead -- The rings or sleeves operate in --.

Signed and sealed this 8th day of July, 1958.

(SEAL)
Attest:

KARL H. AXLINE
Attesting Officer

ROBERT C. WATS
Commissioner of Pate